(12) United States Patent
Citerin et al.

(10) Patent No.: US 11,281,910 B2
(45) Date of Patent: Mar. 22, 2022

(54) GENERATION OF VCA REFERENCE RESULTS FOR VCA AUTO-SETTING

(71) Applicant: CANON KABUSHIKI KAISHA, Tokyo (JP)

(72) Inventors: Johann Citerin, Cesson-Sevigne (FR); Gérald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/462,784

(22) PCT Filed: Nov. 22, 2017

(86) PCT No.: PCT/EP2017/079997
§ 371 (c)(1),
(2) Date: May 21, 2019

(87) PCT Pub. No.: WO2018/095945
PCT Pub. Date: May 31, 2018

(65) Prior Publication Data
US 2019/0370555 A1    Dec. 5, 2019

(30) Foreign Application Priority Data

Nov. 25, 2016   (GB) .................................... 1620009

(51) Int. Cl.
*G06K 9/00*     (2006.01)
*H04N 7/18*     (2006.01)
*H04N 21/44*    (2011.01)

(52) U.S. Cl.
CPC ..... *G06K 9/00718* (2013.01); *G06K 9/00771* (2013.01); *H04N 7/183* (2013.01); *H04N 21/44008* (2013.01)

(58) Field of Classification Search
CPC ........... G06K 9/00718; G06K 9/00771; H04N 7/183; H04N 7/188; H04N 21/44008; G08B 13/19608
See application file for complete search history.

(56) References Cited

U.S. PATENT DOCUMENTS 6,850,252 B1 *   2/2005   Hoffberg ............ G06K 9/00369
                                                    348/E7.061
9,443,320 B1 *   9/2016   Gaidon .................... G06K 9/00
(Continued)

FOREIGN PATENT DOCUMENTS

WO   2011/055288 A1   5/2011
WO   2016/077010 A1   5/2016

*Primary Examiner* — Neil R Mikeska
(74) *Attorney, Agent, or Firm* — Canon U.S.A., Inc. IP Division

(57) ABSTRACT

At least one embodiment of a method of controlling a video surveillance system, the video surveillance system comprising a video content analytics module and a video source, comprises:
- obtaining, by the video content analytics module, from the video source, video data comprising sequences frames, content of the video data comprising a representation of at least one object;
- analyzing at least a part of the video data in the video content analytics module to obtain video content analytics results;
- filtering the obtained video content analytics results to validate at least a subset of the video content analytics results, the validated video content analytics results forming a set of video content analytics reference results; and
- determining a value for at least one configuration parameter of the video surveillance system based on at least a portion of the video content analytics reference results.

19 Claims, 8 Drawing Sheets

(56) References Cited

U.S. PATENT DOCUMENTS

| | | | |
|---|---|---|---|
| 2004/0045030 A1* | 3/2004 | Reynolds | H04L 65/604 |
| | | | 725/110 |
| 2005/0169367 A1 | 8/2005 | Venetianer et al. | |
| 2008/0317379 A1* | 12/2008 | Steinberg | H04N 5/347 |
| | | | 382/275 |
| 2011/0182352 A1* | 7/2011 | Pace | G06T 9/001 |
| | | | 375/240.1 |
| 2012/0140820 A1* | 6/2012 | Kondo | H04N 19/70 |
| | | | 375/240.03 |
| 2012/0170659 A1* | 7/2012 | Chaudhury | G06T 7/194 |
| | | | 375/240.16 |
| 2013/0178304 A1* | 7/2013 | Chan | A63B 69/36 |
| | | | 473/266 |
| 2015/0046953 A1* | 2/2015 | Davidson | G06K 9/00758 |
| | | | 725/74 |
| 2015/0098691 A1* | 4/2015 | Avrahami | H04N 5/783 |
| | | | 386/241 |
| 2015/0310365 A1* | 10/2015 | Li | G06K 9/00771 |
| | | | 705/7.38 |
| 2018/0176577 A1* | 6/2018 | Puri | H04N 19/573 |

\* cited by examiner

GENERATION OF VCA REFERENCE RESULTS FOR VCA AUTO-SETTING

CROSS REFERENCE TO RELATED APPLICATIONS

This application is the National Phase application of PCT Application No. PCT/EP2017/079997, filed on Nov. 22, 2017 and titled "Generation of VCA Reference Results For VCA Auto-Setting." This application claims the benefit under 35 U.S.C. § 119(a)-(d) of United Kingdom Patent Application No. 1620009.9, filed on Nov. 25, 2016. The above cited patent applications are incorporated herein by reference in their entirety.

FIELD OF THE INVENTION

The present invention relates to the technical field of video surveillance systems and more particularly to generation of video content analytics (VCA) reference results for an auto-setting process of VCA systems.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal events detection, traffic monitoring, customer behaviour, or general data gathering.

Despite an ever-increasing usage, mainstream video-surveillance has strong inherent limitations which lead to poor performance, in particular for solving crimes and offenses, due to the way it is used. Basically, video-surveillance consists in streaming camera footages to be recorded and displayed in real-time to human operators. Unfortunately, only a very limited fraction of camera images can be seen in real-time by humans, the remaining footage recordings being used after-action for batch or forensic activities. However, such a forensic after-action viewing is, in practice, rarely used, because it is often too late and useless at this point, and also because it is a time-consuming task to retrieve and track people such as offenders across images from several cameras.

To cope with such difficulties, Video Content Analytics software modules (VCAs) have been developed to perform some automatic video analysis so as to trigger alarms, to make video surveillance far more real-time responsive, and to make it easier to exploit the after-action recorded footages, for example for forensic activities or for batch analysis tasks.

VCAs may be implemented within cameras themselves or within remote servers. Due to resource constraints, in particular of limited CPU power, the VCAs embedded within cameras are mainly used for simple tasks such as alarm triggering when virtual fences are crossed or triggering recording through motion detection. More complex tasks such as human searching, tracking and re-identification, 3D position estimation, advanced counting, face recognition, license plate recognition (LPR), gender and age detection, and abnormal behaviour detection can be handled when VCAs are embedded within remote servers.

The performance of the VCAs is directly linked to the conditions in which the images are acquired and to the settings of the VCAs that should be adapted to the scene. The settings of the VCAs are generally fixed and determined by specialized installers, so as to be finely tuned, which means that each time a VCA is to be re-set, a specialized installer should be present. However, there are few specialized installers and using their service increases the cost and delay for setting the systems. Moreover, updating settings regularly is necessary to cope with camera and scene changes.

Accordingly, there is a need for an automatic process for setting VCAs, making their deployment easier and cheaper, without requiring the need of specialized installers. Such an automatic process is referred to as an auto-setting process below.

It is observed that an auto-setting process is a very complex task that aims at determining the settings that are the more adapted to a specific type of scene and to the current conditions (e.g. environment conditions). A possible solution for determining such optimal settings is based on scene classification so as to select predetermined settings as a function of a predetermined type of scene. However, it needs reliable classification of the scenes to be efficient, that is to say reliable scene measurements and reliable scene modeling. Moreover, such a solution is not adapted to handle every kind of camera and every type of scene.

Therefore, there is a need to improve existing solutions.

SUMMARY OF THE INVENTION

The present invention has been devised to address one or more of the foregoing concerns.

In this context, there is provided a solution for generating VCA reference results that may be considered as ground truth for carrying out an auto-setting process of a video content analytics system.

According to a first object of the invention, there is provided a method for controlling a video surveillance system, the video surveillance system comprising a video content analytics module and a video source, the method comprising:

obtaining, by the video content analytics module, from the video source, video data comprising sequenced frames, content of the video data comprising a representation of at least one object;

analysing at least a part of the video data in the video content analytics module to obtain video content analytics results;

filtering the obtained video content analytics results to validate at least a subset of the video content analytics results, the validated video content analytics results forming a set of video content analytics reference results; and determining a value for at least one configuration parameter of the video surveillance system based on a least a portion of the video content analytics reference results.

According to the method of the invention, efficient video stream settings and VCA settings can be determined easily and automatically, taking into account that auto-setting process is not a real-time process and that VCA settings used during this process do not need to be realistic. The validation process of VCA results makes it possible to select VCA results that should be considered as VCA reference results, improving selection of settings to be used.

The use of VCA reference results during the auto-setting process makes reliable the auto-setting process and contributes to accelerating the auto-setting process by selecting data that makes it possible to determine settings easily.

In an embodiment, the filtering step comprises a step of selecting at least one video content analytics result according to spatial and/or temporal features of the representation of the at least one object in frames of the video data.

In an embodiment, the filtering step comprises the steps of:

identifying and selecting a video content analytics result that is obtained from the greatest number of frames; and determining the number of occurrences of the selected video content analytics result in the frames, wherein the filtering is based on the determined number of occurrences.

The consensus principle makes it possible to filter results and keep only the high quality VCA results that can be considered as VCA reference results.

In an embodiment, the method further comprises a step of discarding a frame of the sequenced frames if the frame is similar to another frame of the sequenced frames, prior to carrying out the analysing step.

In an embodiment, the method further comprises a step of determining a position of the at least one object from each of at least two frames of the sequenced frames and a step of comparing the determined positions to each other, one of the at least two frames being considered as similar to another frame of the at least two frames as a function of the comparing step.

In an embodiment, the method further comprises a step of transcoding frames of the video data, the step of determining a value for at least one configuration parameter being at least partially based on transcoded frames.

In an embodiment, the determining step comprises a step of computing a score representing the efficiency of the video surveillance system, a score being associated with values of a set of parameters of the video surveillance system.

In an embodiment, the determining step comprises a step of comparing scores with each other.

In an embodiment, the method further comprises a step of selecting one configuration parameter of the video surveillance system and for at least two different values of the one configuration parameter, determining optimal values of other configuration parameters.

In an embodiment, the method further comprises a step of modifying a value of at least one configuration parameter of the video surveillance system and of repeating the steps of analysing at least a part of the video data and of filtering the obtained video content analytics results.

An iterative procedure may improve the settings of the VCA used for generating VCA reference results which lead to improving the auto-setting process.

In an embodiment, the modifying step and the repeated steps of analysing and filtering are carried out if the accuracy of the video surveillance system exceeds a threshold.

In an embodiment, the method further comprises a step of weighting a plurality of values of at least one configuration parameter of the video surveillance system, each of the plurality of values being an optimal value associated with a particular use of the video content analytics module.

According to a second object of the invention, there is provided a device for controlling a video surveillance system, the video surveillance system comprising a video content analytics module and a video source, the device comprising a microprocessor configured for carrying out the steps of:

obtaining, by the video content analytics module, from the video source, video data comprising sequenced frames, content of the video data comprising a representation of at least one object;

analysing at least a part of the video data in the video content analytics module to obtain video content analytics results;

filtering the obtained video content analytics results to validate at least a subset of the video content analytics results, the validated video content analytics results forming a set of video content analytics reference results; and determining a value for at least one configuration parameter of the video surveillance system based on a least a portion of the video content analytics reference results.

According to the device of the invention, efficient video stream settings and VCA settings can be determined easily and automatically, taking into account that auto-setting process is not a real-time process and that VCA settings used during this process do not need to be realistic. The validation process of VCA results makes it possible to select VCA results that should be considered as VCA reference results, improving selection of settings to be used.

The use of VCA reference results during the auto-setting process makes reliable the auto-setting process and contributes to accelerating the auto-setting process by selecting data that makes it possible to determine settings easily.

In an embodiment, the filtering step comprises a step of selecting at least one video content analytics result according to spatial and/or temporal features of the representation of the at least one object in frames of the video data.

In an embodiment, the filtering step comprises the steps of:

identifying and selecting a video content analytics result that is obtained from the greatest number of frames; and determining the number of occurrences of the selected video content analytics result in the frames, wherein the filtering is based on the determined number of occurrences.

The consensus principle makes it possible to filter results and keep only the high quality VCA results that can be considered as VCA reference results.

In an embodiment, the microprocessor is further configured for carrying out a step of discarding a frame of the sequenced frames if the frame is similar to another frame of the sequenced frames, prior to carrying out the analysing step.

In an embodiment, the microprocessor is further configured for carrying out a step of determining a position of the at least one object from each of at least two frames of the sequenced frames and a step of comparing the determined positions to each other, one of the at least two frames being considered as similar to another frame of the at least two frames as a function of the comparing step.

In an embodiment, the microprocessor is further configured for carrying out a step of transcoding frames of the video data, the step of determining a value for at least one configuration parameter being at least partially based on transcoded frames.

In an embodiment, the determining step comprises a step of computing a score representing the efficiency of the video surveillance system, a score being associated with values of a set of parameters of the video surveillance system.

In an embodiment, the determining step comprises a step of comparing scores with each other.

In an embodiment, the microprocessor is further configured for carrying out a step of selecting one configuration parameter of the video surveillance system and for at least two different values of the one configuration parameter, determining optimal values of other configuration parameters.

In an embodiment, the microprocessor is further configured for carrying out a step of modifying a value of at least one configuration parameter of the video surveillance system and for repeating the steps of analysing at least a part of the video data and of filtering the obtained video content analytics results.

An iterative procedure may improve the settings of the VCA used for generating VCA reference results which lead to improving the auto-setting process.

In an embodiment, the modifying step and the repeated steps of analysing and filtering are carried out if the accuracy of the video surveillance system exceeds a threshold.

In an embodiment, the microprocessor is further configured for carrying out a step of weighting a plurality of values of at least one configuration parameter of the video surveillance system, each of the plurality of values being an optimal value associated with a particular use of the video content analytics module.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

According to particular embodiments of the invention, a VCA reference result is generated under favourable conditions and validated to be used as a ground truth for evaluating and/or optimizing VCA settings. Such a VCA reference result may be inferred from chunks that are derived from a video sequence used for performing an auto-setting process. It is preferably generated from a VCA used in optimal conditions regarding the images to be used (e.g. high frame rate, high image quality, and low image compression) and the VCA settings.

Figure 1:
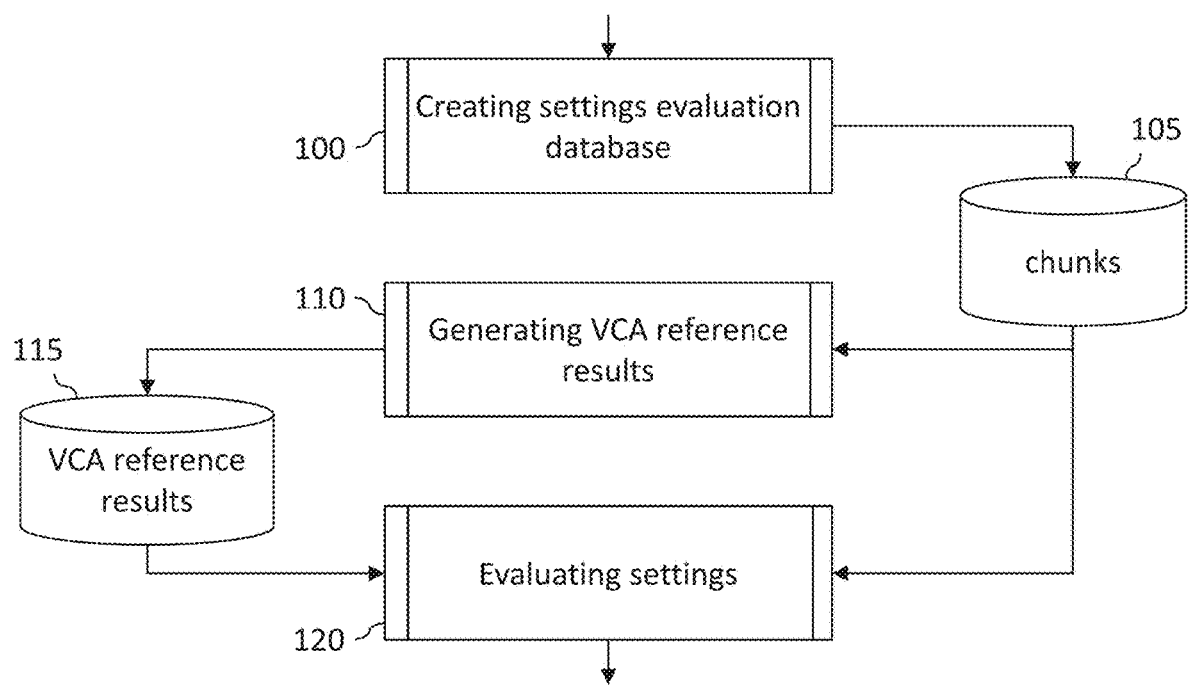
FIG. 1 illustrates schematically three main phases for evaluating and preferably optimizing settings of a VCA system according to embodiments of the invention.

FIG. 1 illustrates schematically three main phases for evaluating and preferably optimizing settings of a VCA system according to embodiments of the invention.

As illustrated, a first phase (100) is directed to creating a database for evaluating settings. This database comprises images that can be used in a VCA for auto-setting purpose.

It has been observed that in order to optimize the auto-setting process, some of the following criteria should be considered for creating this database:

the image source is preferably the camera associated with the VCA that auto-setting is to be carried out. Indeed, since the settings are related to the scene which is captured by the camera, it is important that the images come from the camera itself, where the VCA is implemented or in relation with which the VCA installation is to be done;

the images should be representative of the problem to be solved as a whole. They should be representative of the different situations expected for the camera and the VCA system. This is important so as to find settings that are appropriate to most of the situations;

the quality of the images or frames is preferably the highest;

there is advantageously a single database of images (each image being possibly stored according to different formats, e.g. different resolutions and different coding) so that the comparison of results provided with different settings is meaningful; and the number of images within the database is determined in relation with the amount of resources that are available for evaluating the settings so that the time required for carrying out the auto-setting process is not prohibitive.

As described with reference to FIG. 2, the database of images (105) may be created by selecting images within a video stream obtained from an image source. The selected images can be processed to create new images, for example down-sampled images, that are also stored in the database, to be used in the VCA during the auto-setting process. The sequences of images that are selected in the video stream to be used during the auto-setting process are referred to as chunks.

Turning back to FIG. 1, a second phase (110) is directed to generating VCA reference results to be used as ground truth for evaluating the efficiency of VCA settings. According to particular embodiments, the VCA reference results are VCA results that have been validated and thus, that are considered to be very close to the ground truth.

To that end, the VCA is used in optimal conditions regarding the images to be used (e.g. high frame rate, high image quality, and low image compression) and the VCA settings so that the results are of high quality. Moreover, the accuracy of the results is evaluated using additional spatial and/or temporal data in robust algorithms such as tracking algorithms and consensus algorithms as described by reference to FIG. 4 so that only results of high reliability are used during the auto-setting process.

According to particular embodiments, each image of each chunk of the settings evaluation database, in its best quality, is used to try to obtain at least one VCA reference result associated with the considered image. Depending on the type of VCA, several VCA reference results may be associated with a single image. For example, assuming a license plate recognition (LPR) VCA and an image comprising the representation of three cars, considered as three targets, the VCA reference results may consist of two license plate numerals associated with two targets, that are considered as reliable, while the third license plate numerals, considered as not reliable, do not belong to the VCA reference result.

The VCA reference results may be stored in database 105 or in another database, for example in a dedicated VCA reference result database 115.

A third phase (120) is then carried out to evaluate and preferably optimize settings of the VCA in view of the chunks of the setting evaluation database, in their different qualities, and in view of the VCA reference results. By evaluating different settings, one can choose settings that prove to be optimal (or close to the optimum) in view of the current conditions.

Creating the Settings Evaluation Database

Figure 2:
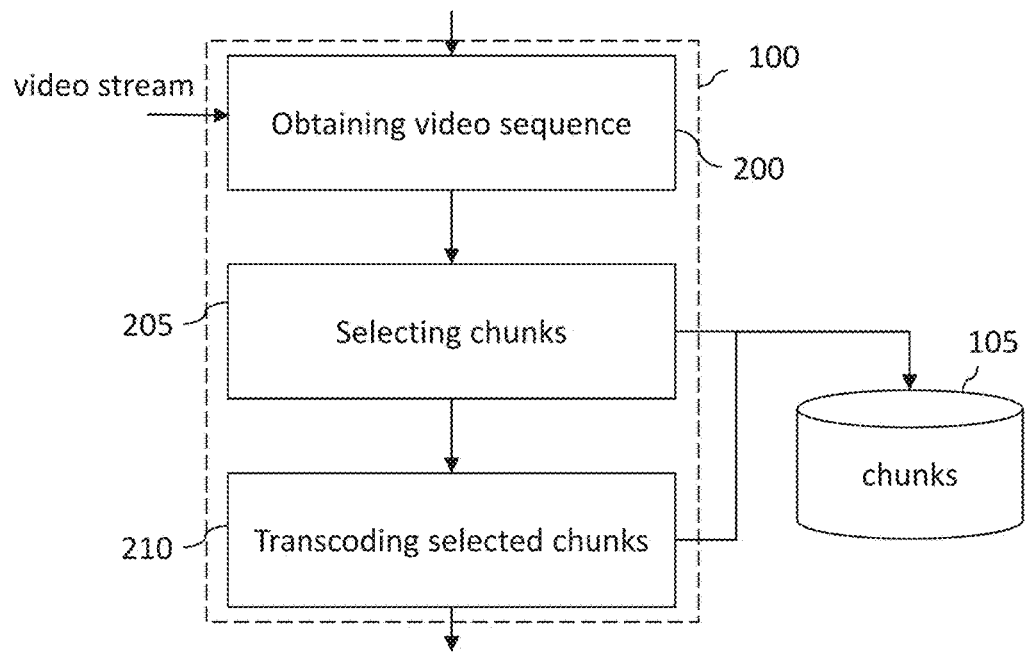
FIG. 2 illustrates an example of steps of a method according to embodiments of the invention for creating a database, as illustrated in FIGS. 1, 7, and 12.
Figure 7:
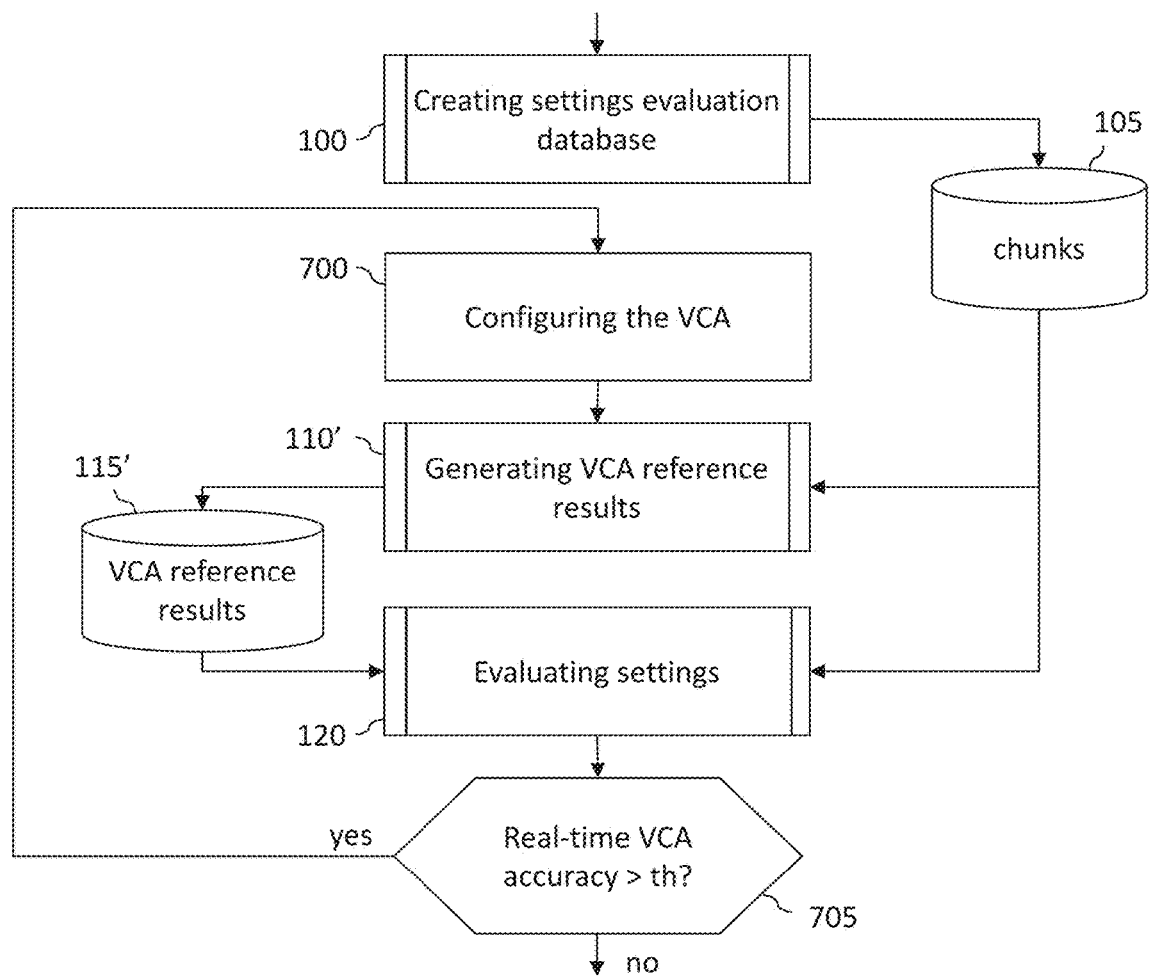
FIG. 7 illustrates schematically main phases and steps for evaluating and preferably optimizing VCA settings according to embodiments of the invention, using an iterative determination of VCA reference results.
Figure 12:
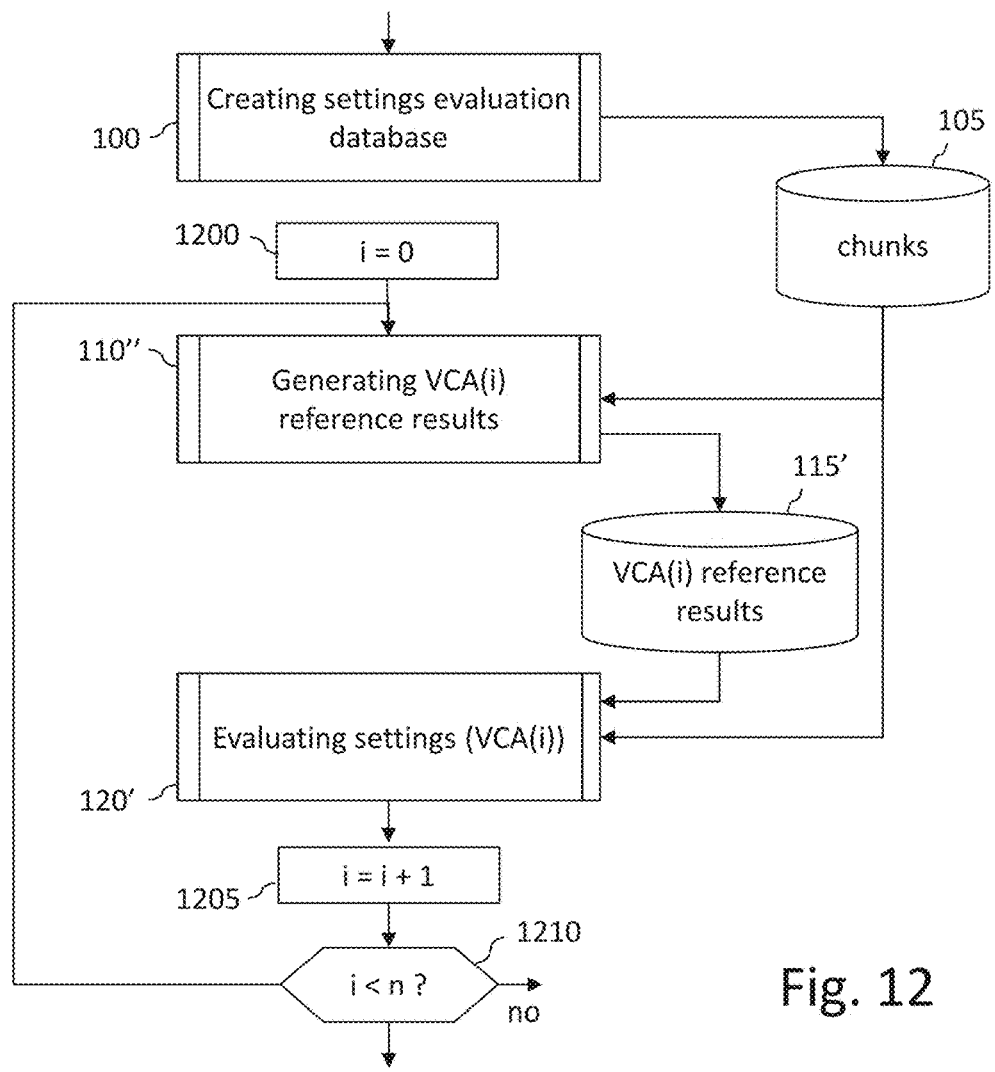
FIG. 12 illustrates schematically main phases and steps for evaluating settings as a function of different tasks to be performed, according to embodiments of the invention.

FIG. 2 illustrates an example of steps of a method according to embodiments of the invention for creating a database, as illustrated in FIGS. 1, 7, and 12.

As illustrated, a first step (step 200) is directed to the acquisition and possibly storage of a video sequence. The obtained video sequence has advantageously a high frame rate and the images of this sequence are preferably of high quality. For the sake of illustration, the video sequence may be based on the H.264 codecs which allow high frame rates and high quality images even with a reduced communication bandwidth.

The video sequence should correspond to a representative period of time. For the sake of illustration, the latter may be equal to 24 h so as to encompass different lighting conditions. It may be obtained from a camera, preferably the camera associated with the VCA for which auto-setting is to be carried out, or from a storage device.

Table 1 in the Appendix gives an example of video stream settings that can be used for creating a database for evaluating settings.

Next, after having obtained a video sequence, a chunk selection is preferably carried out to select the images that are to be used for creating the database for evaluating settings (step 205) so as to avoid creating a huge database. Indeed, a long-duration shooting at high frame rate can lead to millions of frames that would take a considerable amount of time to analyse with most VCAs, which is not realistic. Only a few hundred frames are generally required, scattered around a few dozen representative time periods. Accordingly, small-duration chunks that are to be used in the auto-setting procedure are selected.

According to particular embodiments, the chunks selection is carried out according to multi-step filtering that may comprise motion detection and random picking. Other selection mechanisms may be used.

Since it has been observed that for most VCA scenarios, only periods of time during which motion in the images can be seen are of interest, similar frames in still (or almost still) image sequences of the video sequence are preferably withdrawn. This can be done automatically based on motion detection (for example by using a motion detector module implemented in the used camera or by using a video motion detector module implemented in a recording server). The remaining groups of contiguous images are selected as chunks.

In order to reduce even more the number of images in the selected chunks, a second filter is preferably applied. Since it is difficult to filter the chunks based on vague criteria such as diversity and since representativeness is more important than diversity, a simple random selection can be done, with the requirement that it is scattered along the whole time duration, to avoid selecting particular chunks and to increase the diversity of situations.

The chunks that are selected during the multi-step filtering are preferably stored within database 105.

Next, a transcoding step is performed (step 210) to obtain transcoded images corresponding to the images of the selected chunks. These transcoded images are good approximations of low quality and low resolution images corresponding to settings used in real VCA systems. There exist many good solutions to obtain good quality lower resolution images starting from high resolution ones, such as Bicubic and Lanczos interpolation kernels. Similarly, many good solutions exist to obtain lower quality images, such as re-encoding the high quality images through a software encoder such as ffmpeg (ffmpeg is a set of open source software components for processing audio and image streams).

Alternatively, it is possible to obtain several video streams of the same scene, each of the video streams corresponding to a specific quality level, from a high quality level to a low quality level, the multi-step filtering being applied (preferably identically) to each of the obtained video streams to select chunks of different quality levels.

The transcoded images (forming chunks corresponding to the selected chunks resulting from the multi-step filtering) are preferably stored in database 105. Alternatively, they can be stored in one or several other databases.

Figure 3:
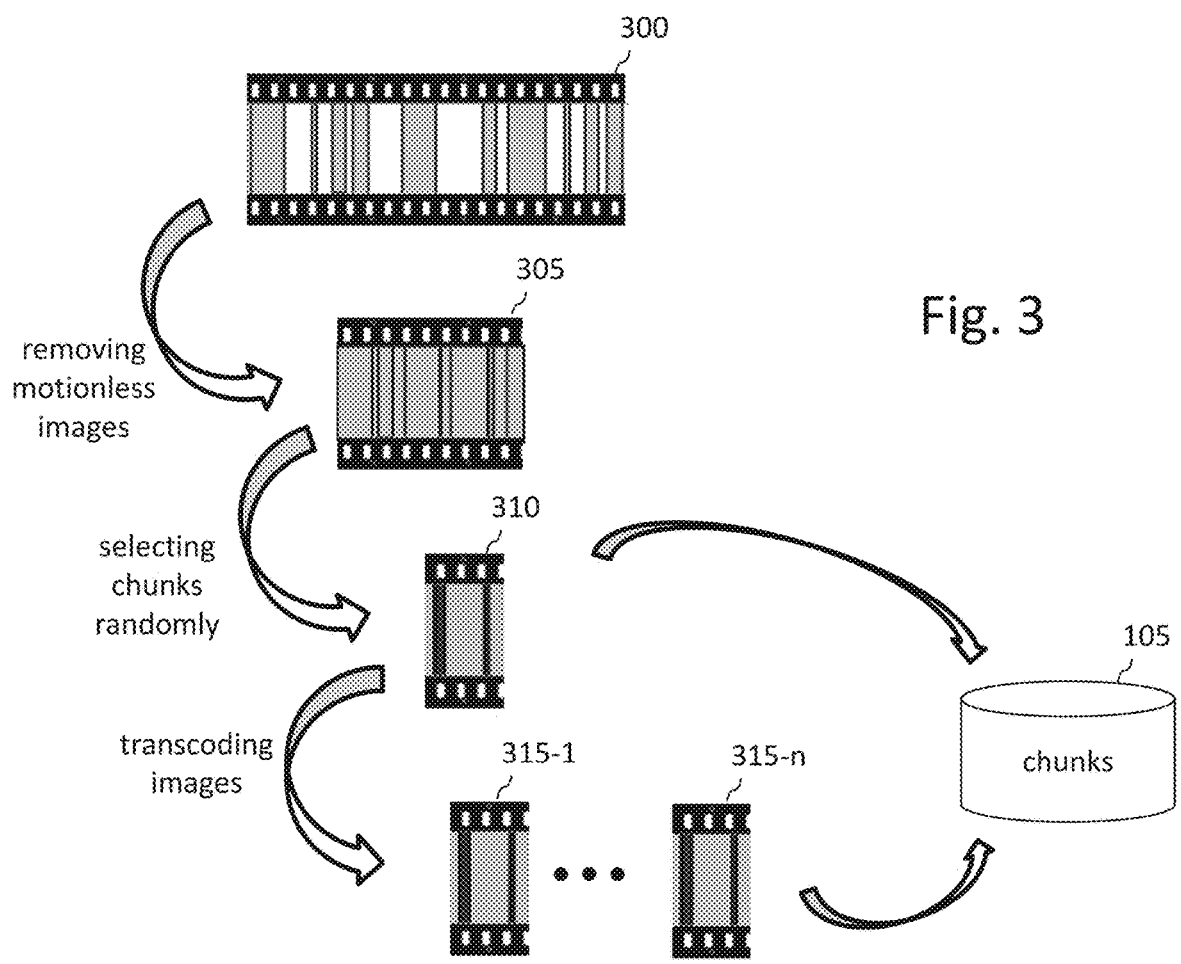
FIG. 3 illustrates the way the settings evaluation database is created according to the method illustrated in FIG. 2.

FIG. 3 illustrates the way the settings evaluation database is created according to the method illustrated in FIG. 2. As illustrated, a video sequence 300 is obtained and then filtered for removing motionless sequences of images. The resulting chunks 305 are then filtered again for selecting chunks randomly among the previously selected chunks. The obtained chunks 310 are stored in database 105 and the images of these chunks are transcoded according to different quality levels to obtain sequences of images denoted 315-1 to 315-*n*, the transcoded images being stored in database 105.

Obtaining VCA Reference Results

Figure 4:
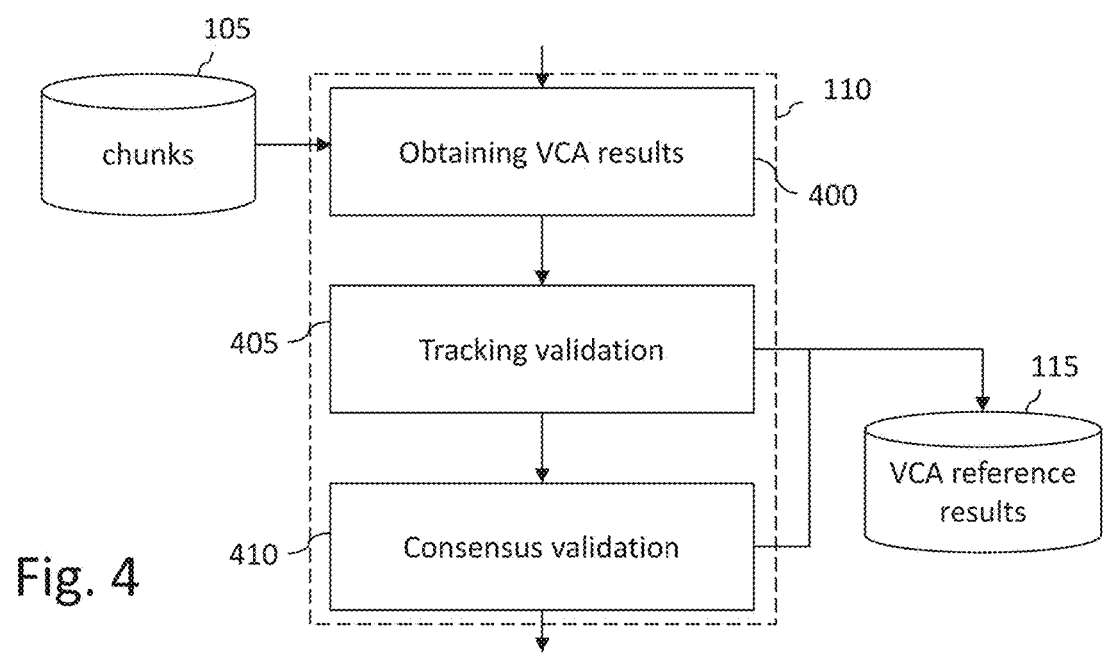
FIG. 4 illustrates an example of steps of a method according to embodiments of the invention for generating a VCA reference result to be used as a ground truth for evaluating the efficiency of VCA settings, as illustrated in FIGS. 1, 7, and 12.

FIG. 4 illustrates an example of steps of a method according to embodiments of the invention for generating a VCA reference result to be used as a ground truth for evaluating the efficiency of VCA settings, as illustrated in FIGS. 1, 7, and 12.

According to particular embodiments, there is no particular constraint on the VCA used for generating a VCA reference result, referred to as the reference VCA, and on its settings. Therefore, this makes it possible to use time and resource consuming settings or even a specific or dedicated VCA and thus, to obtain a high quality result. However, although the obtained result is of high quality, it should be preferably validated and possibly corrected before it can be used as a ground truth.

As illustrated in FIG. 4, a first step (step 400) aims at obtaining a result from the reference VCA for an image of a chunk (among the selected chunks).

Next, at least one step of validation is preferably carried out.

A first step of validation (step 405) may be based on a robust error correction algorithm which exploits the time dimension and corresponding time/spatial coherence to detect errors. The high frame rate of the obtained video sequence, according to which there are very small differences (in terms of position of the same target) from one frame to the next, makes such an algorithm efficient.

In other words, step 405 makes it possible to identify the same targets in different frames. In addition, step 405 may benefit from the robust error correction algorithm to fill in some of the missing detections.

Advantageously, the features of the VCA are used to carry out this algorithm. Indeed, most of the advanced VCAs use spatial localization, in particular for detecting targets of interest, for example with the aim of object tracking, of license plate recognition, of face recognition, or of abandoned luggage detection.

By using the spatial localization done by the VCA to track an object of interest with a very high confidence and accuracy over several images, it is possible to detect errors. For the sake of illustration, if it is assumed that a target is detected by the VCA in almost all the images of a chunk except one, the probability that the VCA result for this image is not correct is very high and thus, it may be considered that this result is not be used as a VCA reference result (i.e. as ground truth). The same result that is obtained for almost all the images of the chunk may be considered as a VCA reference result. This example is illustrated in FIG. 5.

Figure 5:
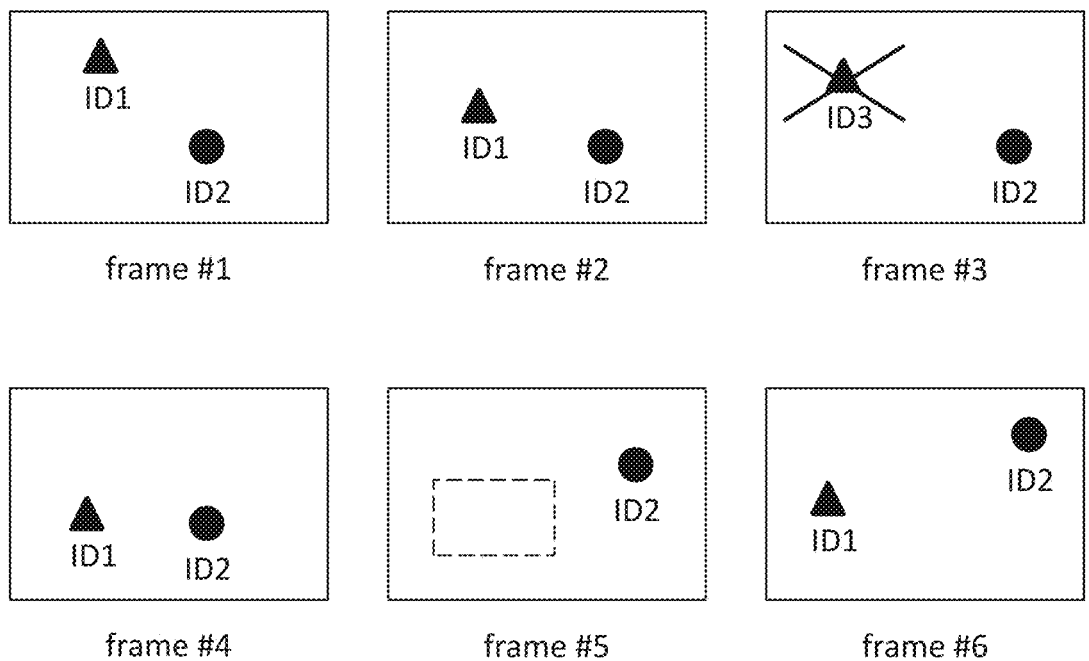
FIG. 5 illustrates schematically the principle of object tracking for validating VCA results.

FIG. 5 illustrates schematically the principle of object tracking for validating VCA results. It is assumed that the considered chunk comprises six images denoted frame #1 to frame #6 and that spatial localization features of the VCA are used to detect objects of interest. Accordingly, the spatial localization features of the VCA detect:
  an object having identifier ID1 and an object having identifier ID2 in frame #1;
  an object having identifier ID1 and an object having identifier ID2 in frame #2;
  an object having identifier ID3 and an object having identifier ID2 in frame #3;
  an object having identifier ID1 and an object having identifier ID2 in frame #4;
  an object having identifier ID2 in frame #5;
  an object having identifier ID1 and an object having identifier ID2 in frame #6; From these identified objects, it may be concluded that the VCA result consisting in identification of the object having identifier ID3 in frame #3 is not reliable.

The high accuracy of the tracking algorithm makes it possible to detect errors since tracked objects must have a same VCA result. If not, it means there is an identification error. Similarly, a tracked object cannot disappear on one frame and reappear on another frame. If the VCA results show such an impossible behaviour, it means there is a detection error.

It is observed that this algorithm for validating VCA results is simple and very cheap in terms of code since it uses the spatial localization capabilities already implemented within the VCA.

It is also noted that this algorithm makes it possible to detect errors but also to correct them or some of them. For the sake of illustration, if a target is not identified within a frame using the tracking algorithm, its position may be determined by interpolation from the ones of the target detected within the following and/or preceding frames. Therefore, the VCA result associated with the frame wherein the target has not been identified using the tracking algorithm may be validated if the position of the target can be interpolated from other frames (such an interpolation being reliable in view of the high frame rate).

Turning back to FIG. 4, a second step of validation (step 410) may be based on a consensus algorithm according to which it is assumed that errors are erratic whereas truth is unique. This property has been verified in practice, in particular with an LPR VCA.

Step 410 aims at identifying targets by comparing tags obtained from the tracking algorithm so as to determine, if possible, the real tag of each target. This makes it possible to detect and correct a false tagging of a target in a frame.

It is noted that thanks to the high frame rate that is used to generate VCA reference results, several images representing the same targets can be obtained. Therefore, by using the tracking algorithm of step 405, it is possible to detect the same target over several images and thus, it is possible to compare VCA results for the same target over several images. For the sake of illustration, if the same car is detected over a set of images, the license plate characters associated with this car can be compared for each of these images so as to determine which characters are the most probable. Accordingly, the erratic property of errors may be exploited to find out the truth by using the consensus principle.

Consensus principle states that given a distribution of results for the same target, truth is more likely to appear than any other result. However, it has been observed that a simple "majority rule" does not provide reliable results. Therefore, more specific rules should be used.

As described above, it is very important for VCA reference results to be mostly valid results. However, determining a VCA reference result for each image of the database used for auto-setting purpose is not necessary since the auto-setting process can be executed with a subset of the database. Therefore, the consensus rules should provide a filtering algorithm for VCA results making it possible to select only highly probable VCA results that can thus be considered as VCA reference results.

Such a selection step is based on targets identified in the images of the settings evaluation database. Images wherein one or more targets have been validly identified (by detection or computation (e.g. interpolation)) are to be considered for auto-setting purposes while images wherein no target has been validly identified should be ignored.

According to particular embodiments, a selection algorithm based on the following relations can be used for determining whether or not a VCA result $R_1$ should be used as a VCA reference result. VCA result $R_1$ should be used as a VCA reference result if:

$$\frac{R_1}{R_2} > th_1$$

and $$R_1 > th_2$$

and $$\frac{R_1}{R_{total}} > th_3$$

where, $R_i$ is the $i^{th}$ most frequent result;

$R_{total}$ is the total number of detections for the considered target; and $th_1$, $th_2$, and $th_3$ are predetermined thresholds.

According to the first relation ($R_1/R_2 > th_1$), VCA result $R_1$ is considered as a VCA reference result only if this most frequent result found for the target has a high ratio of detections as compared to the second most frequent result ($R_2$).

Threshold $th_2$ in the second relation ($R_1 > th_2$) is a condition on the sheer number of detections and threshold $th_3$ in the third relation ($R_1/R_{total} > th_3$) is a condition on the detection rate. These relations state that the number of detections and the detection rate of the most frequent result should also be high enough.

These equations make it possible to determine, for each target, if a consensus is reached or not. In other words, they filter the VCA results to tag them as "VCA reference result" if a consensus is reached. The thresholds are chosen so as to make these relations a restrictive filter.

It is to be noted that in a given chunk of the database, there may be VCA results that are considered as VCA reference results and other VCA results that are not considered as VCA reference results. The latter should be ignored for selecting settings. However, since VCA results are spatially located and since it is highly unlikely that one error for one target corresponds exactly to the truth of another target, such a chunk is useful and should not be discarded from the database.

Figure 6:
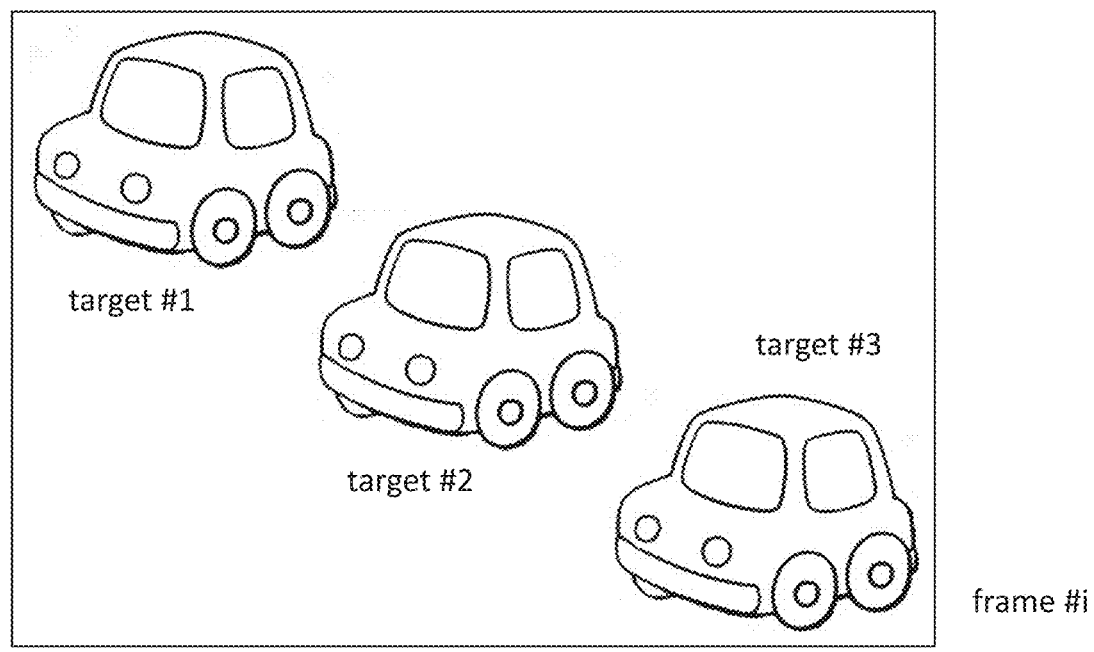
FIG. 6 represents an image of a chunk of the database used for auto-setting wherein three targets have been detected, license plate characters being associated with each target.

Table 2 in the Appendix illustrates an example of using the principle of consensus for validating VCA results obtained from a sequence of images such as the one illustrated in FIG. 6. More precisely, Table 2 lists all the license plate set of characters that have been identified for each detected target and the associated number of detections. These results correspond to images obtained from a camera for a very short period of time (here 1.6 sec) obtained at a frame rate of 25 frame per second (i.e. the sequence of images comprises 40 frames). For the sake of illustration, targets are cars parked in a parking lot, which do not move at all. Distance to the camera and angle have been chosen to generate many mistakes. Despite an apparent immobility of targets and camera, VCA results vary significantly while truth is unique.

For the sake of illustration and as can be observed from Table 2, the license plate set of characters "CR621CM" has been detected in 36 images, regarding target 1. It may be concluded from Table 2 that the results "CR621CM" and "BD952JP" can be considered as VCA reference results for target #1 and target #3, respectively, and that no VCA reference result is associated with target #2.

The relations described above may be used to determine whether or not a VCA result is to be considered as a VCA reference result, for each target and for each image of the considered chunk.

The VCA results that are validated at the end of the two validation steps are considered as solved targets, forming VCA reference results. They can be stored in the VCA reference result database 115 or in another database.

Since VCA reference results are much more accurate than results obtained with real-time VCAs, the solved targets (i.e. the targets which have reached a consensus, that are considered as VCA reference results) make it possible to perform the whole auto-setting process.

However, it can happen that during auto-setting process, a sharp improvement of results is observed for the real-time VCAs to be tested. If the settings of such real-time VCAs become much better than the settings used for obtaining VCA reference results, it is difficult to compare the best real-time VCAs together and thus, more difficult targets should be used.

To that end, new VCA reference results may be obtained from VCA results that have not been validated, by using the most accurate settings of the real-time VCA to set the reference VCA used to generate the VCA reference results. Such an iterative step may be done, for example, when the accuracy of the real-time VCAs, as compared to the VCA reference results, reaches 80 to 90% for solved targets during auto-setting process.

However, it should be noted that the used VCA reference results have been validated and/or corrected through steps 405 and 410. Accordingly, the accuracy of the used VCA reference result (as compared to theoretical results) is better than the accuracy of the VCA reference results before correction (still as compared to theoretical results). Therefore, the high ratio of 80 to 90% may indeed mean that the real-time VCAs are in fact more accurate than the reference VCA that has been used to generate the VCA reference results (before they are validated and/or corrected).

Alternatively, it is also possible to compare real-time VCAs results with the VCA reference results before validation and/or correction) and to observe when they become similar or better. Such real-time VCAs may become the new reference VCA. By applying the validation and/or correction steps 405 and 410 on the VCA reference results obtained from this new reference VCA, reference results accuracy will increase even further.

FIG. 7 illustrates schematically main phases and steps for evaluating and preferably optimizing VCA settings according to embodiments of the invention, using an iterative determination of VCA reference results.

After having created a database for evaluating settings (phase 100), for example as described by reference to FIG. 1, settings for the VCA to be used for generating VCA reference results are determined and the VCA is configured (step 700). Such a configuration may be a default configuration.

Next, a second phase (110') is directed to generating VCA reference results to be used as ground truth for evaluating the efficiency of VCA settings, as described by reference to phase 110 in FIG. 1.

Next, a third phase (120) is carried out to evaluate and preferably optimize settings of the VCA in view of the chunks of the setting evaluation database, in their different qualities, and in view of the VCA reference results, as described by reference to FIG. 1.

After having evaluated VCA settings or during evaluation of VCA settings, a test is carried out to determine the accuracy of the real-time VCA according to the evaluated settings (step 705). If the accuracy is less than or equal to a predetermined threshold (th), the auto-setting process ends. On the contrary, if this accuracy is greater than the predetermined threshold, the most accurate settings are selected to configure the VCA used for generating VCA reference results (step 700).

Next, the step of generating VCA reference results is repeated (phase 110'). According to a preferred embodiment, this step is carried out only for previous VCA results that have not been validated (i.e. previous VCA results that have not been considered as VCA reference results).

The process continues until VCA settings have been evaluated and/or determined.

Evaluating VCA Settings

Evaluating VCA settings consists as a whole in evaluating the VCA accuracy when it is configured according to the considered settings, in view of all the VCA reference results. Therefore, it consists in loading all the images associated with VCA reference results in the VCA, running the latter, and comparing the obtained results with the corresponding VCA reference results (for the target(s) corresponding to these VCA reference results).

According to particular embodiments, a global score is determined for each setting. It may be calculated according to the following relation:

$$score_{VCAsetting} = \alpha\left(\frac{true\_detections}{num\_detections}\right) + \beta\left(\frac{false\_detections}{num\_detections}\right) + \gamma\left(\frac{resource\_used}{resource\_allowed}\right)$$

where, $\alpha$, $\beta$, and $\gamma$ are coefficients, $\alpha$ being greater than zero and $\beta$ and $\gamma$ being smaller than zero;

true_detections is the total number of true detections (i.e. the number of real-time VCA results that are equal to the corresponding VCA reference results), for all the chunks. It corresponds to the number of true positives;

false_detections is the total number of false detections (the number of false positives), that is to say the number of detections for which the VCA result is different from the corresponding VCA reference results;

num_detections is the total number of detections (i.e. the number of VCA reference results or solved targets), for all of the chunks; and, resource_used and resource_allowed are the used resource and the total amount of resource that may be used by the system, respectively.

If the system is limited by several different types of resource, the previous relation may be written as follows:

$$score_{VCAsetting} = \alpha\left(\frac{true\_detections}{num\_detections}\right) + \beta\left(\frac{false\_detections}{num\_detections}\right) + \sum_i \gamma_i\left(\frac{resource\_used_i}{resource\_allowed_i}\right)$$

For the sake of illustration, if the resources comprise processing resources (CPU, Central Processing Unit) and network resources, the relation may be written as follows:

$$score_{VCAsetting} = \alpha\left(\frac{true\_detections}{num\_detections}\right) + \beta\left(\frac{false\_detections}{num\_detections}\right) + \gamma_{CPU}\left(\frac{CPU\_used}{CPU\_available}\right) + \gamma_{network}\left(\frac{network\_used}{network\_available}\right)$$

Depending on the goal of the VCA system, coefficients $\alpha$, $\beta$, $\gamma$ can be modified similarly to those of the known F-score generally used for evaluating settings as a function of a real ground truth. Regarding F-score, F1 can be used, for example, where recall is as important as precision (i.e. false positive errors are considered to be as bad as true negative errors). F2 (which weights recall twice as high as precision) or F0.5 (where recall is weighted half as high as precision) can also be used.

For the sake of illustration, if recall is more important than precision, $\alpha$ can be increased over $\beta$. If resource consumption is critical, then $\gamma$ can be increased.

According to a typical example according to which good recall and precision are to be attained while resources are not really relevant could lead to:

$$\alpha=1, \beta=-1, \gamma=-0.1$$

According to particular embodiments, none of the $\alpha$, $\beta$, and $\gamma$ coefficients is equal to zero since there are many cases where one setting does not change the accuracy, but changes resource consumption.

For the sake of finding settings for the VCA system during the auto-setting process, video stream settings (e.g. image resolution, compression, and frame rate) and VCA settings should be preferably considered separately and thus, VCA settings are optimized for each video stream settings (since, for example, optimal VCA settings are very dependent upon the image resolution and compression).

Still according to particular embodiments, the frame rate is not to be considered as a setting to be optimized during auto-setting.

It is noted here that the VCA accuracy is necessarily lower if quality or resolution is lower and that the quality has no impact on the CPU, it has only an impact on accuracy and on network resources. Compression is to be optimized or not depending upon network conditions. If there is no network issue for the VCA system, this parameter is preferably ignored, the compression settings being set to high quality values. On the contrary, if the communication network is of importance for the VCA system, compression should be considered as a parameter to be optimized. Similarly, resolution is to be optimized or not depending upon network conditions and CPU/memory conditions. If there is no network issue, and no CPU or memory issue, the resolution settings are set to high values. On the contrary, if one of these resources is of importance for the VCA system, resolution should be considered as a parameter to be optimized. When resources should be considered as a parameter to be optimized, the score of the VCA evaluation has to take into account CPU and network resource consumption, similarly to CPU resource consumption, through a penalty that is proportional to the use of the CPU and network resources.

During the auto-setting process of stream parameters (compression and resolution), VCA accuracy cannot be better when using smaller resolutions, but resource consumption can be much better. So, the only chance to get a better score is through a resource-related better score. This means that if at some point the score gets worse when using a smaller resolution, the better resource consumption does not compensate for the worse accuracy. Therefore, by decreasing resolution any further, the score will obviously be even worse. Accordingly, it is not necessary to decrease further resolution or compression to perform tests.

Figure 8A:
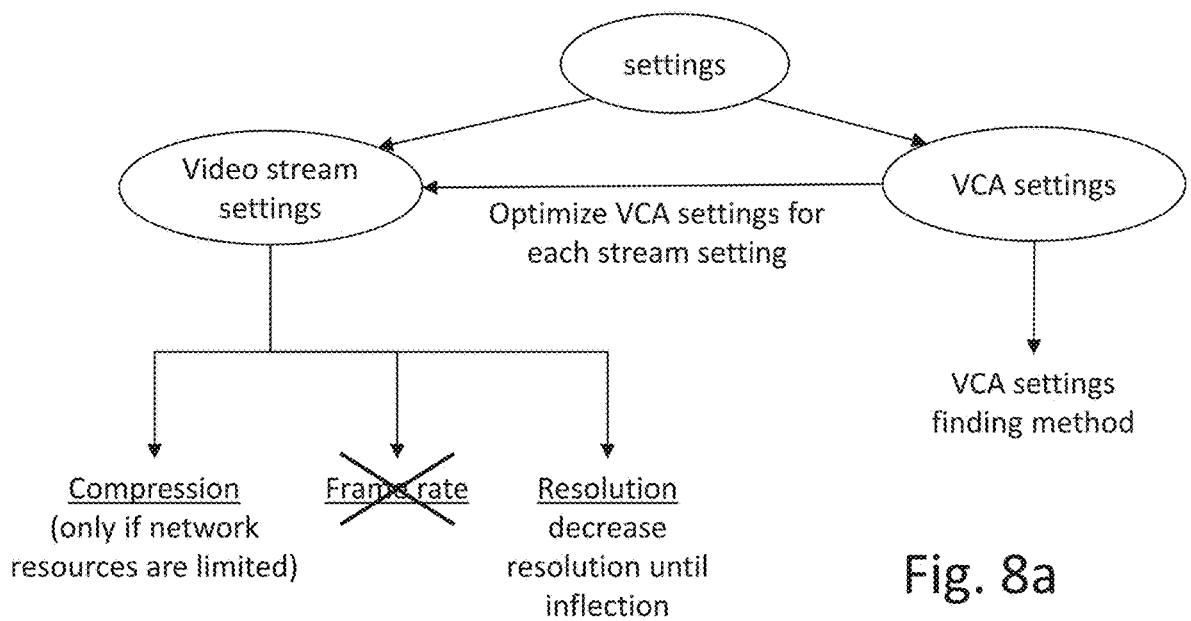
FIGS. 8a and 8b, illustrates an example of a process for finding optimal settings of a VCA system.
Figure 8B:
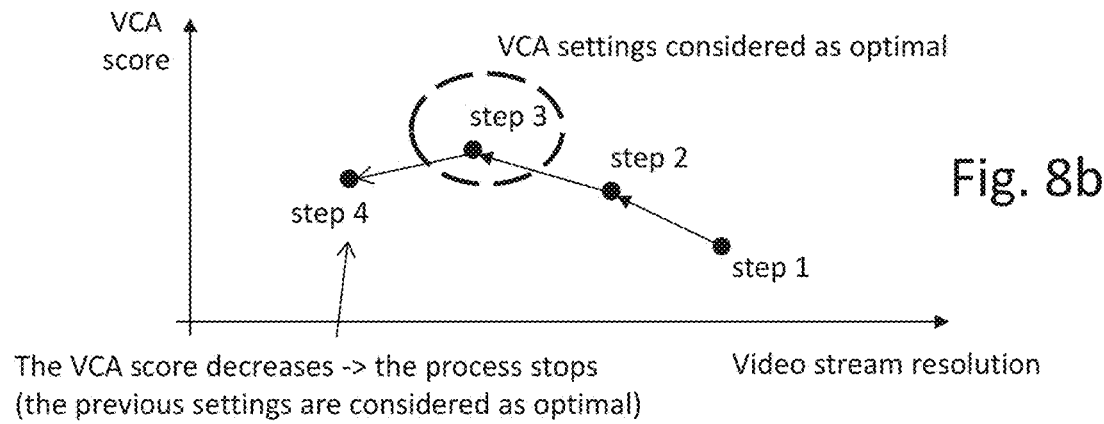

FIGS. 8a and 8b, illustrate an example of a process for finding optimal settings of a VCA system.

As illustrated, the frame rate is not considered as a parameter to be optimized and the compression needs to be optimized only when network resources are limited. The resolution is decreased progressively until the VCA score decreases. For each resolution, optimum VCA settings are determined.

Finding an optimal VCA setting for a given video stream setting consists as a whole in finding which setting offers an optimal score as calculated by the VCA evaluation criterion, according to the VCA reference results, for the considered video stream setting. It is an optimization problem for which there exist several strategies.

A simple solution known as brute force consists in trying each of the possible settings, that is to say in iterating over all the VCA settings and choosing the best one. Although this strategy makes it possible to find optimal settings results, it cannot be used if there are too many settings to test.

Another solution is based on the use of profiles, each profile being associated with a particular type of scene such as a gate (a well-lit car stops at close distance) and a highway (medium-distance fast cars seen from above), in LPR examples. Such scenes may be classified down to a few scene classes (e.g. 15-20 different ones). According to this solution, "profiles" of settings are used, a VCA score being computed for each profile. Such a solution is based on iterating over the profiles.

Profiles may also be organized as trees. This solution is particularly adapted to the case according to which there are many possible profiles that should be created automatically for each main type of profiles.

Still according to another solution, referred to as convergence, all the settings are split into independent settings that are tested separately.

It is also possible to combine these different solutions, for example to determine parameters according to one solution and to determine other parameters according to another solution or to begin with one solution and then move to another solution.

Whatever the method used, it is possible to abort testing when it becomes obvious that one setting choice is worse than the best found so far. This allows to speed-up the testing.

It has been observed that using profiles makes it possible to identify good video stream settings and good VCA settings in most circumstances.

As illustrated in Table 3 of the Appendix, the settings that may be optimized here include some image-quality-related settings (i.e. the video stream settings) and VCA settings. As described above, the video stream settings may comprise, for example, a frame rate, a quality (or compression ratio), and an image resolution. The VCA settings, for example the VCA settings of an LPR VCA, may comprise, for example, a character size, a stop criterion, and two thresholds.

Tables 4a and 4b illustrate two examples of setting profiles having different values. For the sake of illustration, video stream values of profile 1 (Table 4a) correspond to high quality images, a video stream having a frame rate of 25 frames per second, and frames having a resolution of 1080p while the VCA values of this profile correspond to a character size of 96 p, a stop criterion of 2 s, and thresholds set to 180 and 260. Still for the sake of illustration, video stream values of profile 2 (Table 4b) correspond to low quality images, a video stream having a frame rate of 15 frames per second, and frames having a resolution of 720p while the VCA values of this profile correspond to a character size of 72 pi, a stop criterion of 1 s, and thresholds set to 120 and 140.

Figure 9:
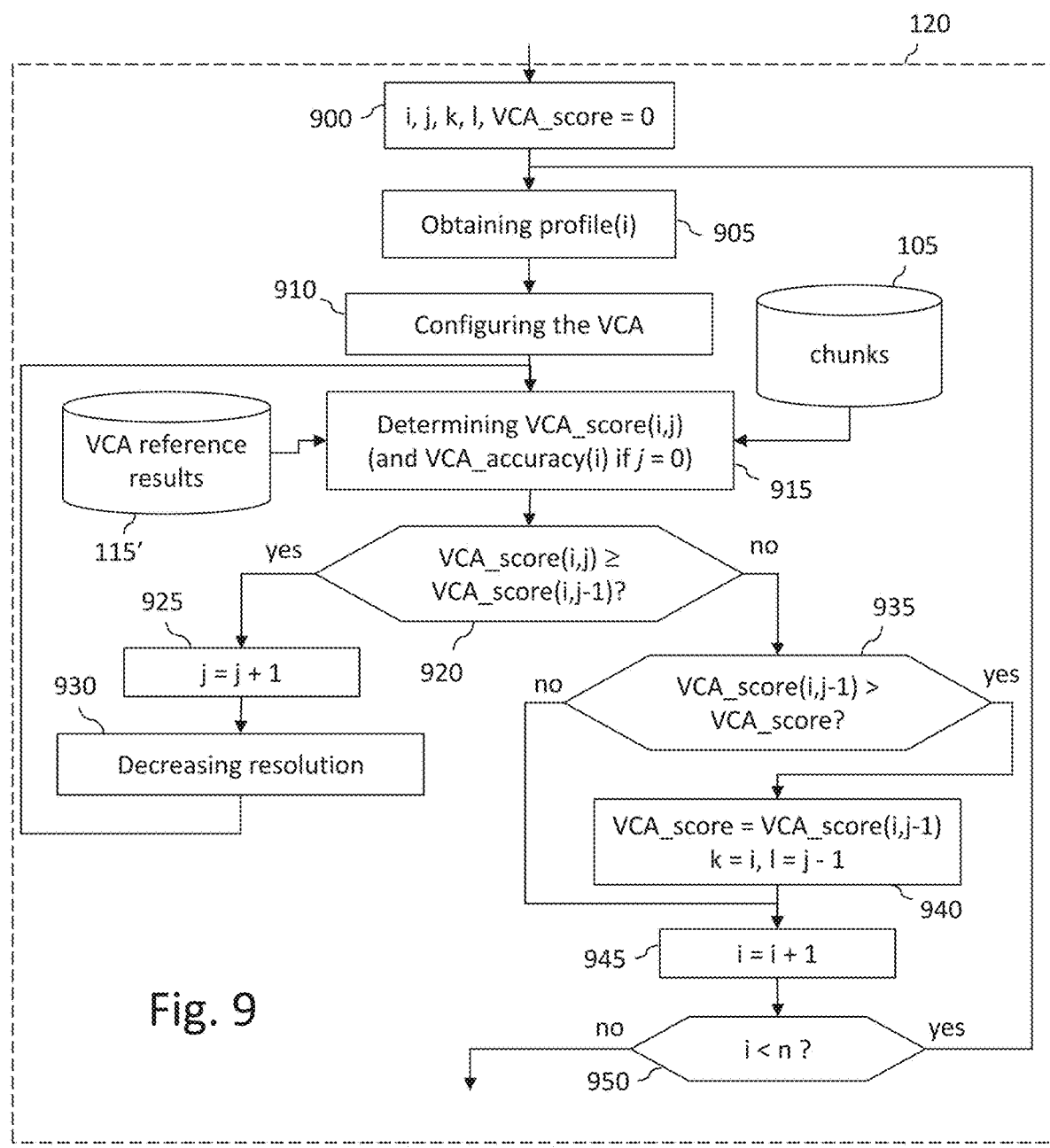
FIG. 9 illustrates an example of steps of a method according to embodiments of the invention for evaluating and optimizing the efficiency of settings of a VCA system, as illustrated in FIGS. 1, 7, and 12.

FIG. 9 illustrates an example of steps of a method according to embodiments of the invention for evaluating and optimizing the efficiency of settings of a VCA system, as illustrated in FIGS. 1, 7, and 12.

As illustrated, indexes i, j, k, and l are initialized to zero in a first step (step 900). According to this example, index i represents a profile index varying from zero to n−1 (n representing the number of profiles to be tested), index j represent an index on the resolutions that are tested, k represent the index of the profile that provides the best score VCA_score (that is also set to zero at step 900), and l represents the index on the resolutions that provides the best score.

The profile having index i is obtained (step 905) and the VCA is configured accordingly (step 910).

Next, each image of each chunk with which at least one VCA reference result is associated is used to test the VCA configured with the current profile having index i. The evaluation comprises, in particular, the step of computing a score VCA_score (i, j) and, for the higher resolution (i.e. j=0), an accuracy VCA_accuracy(i). The score is typically used for selecting a profile while the accuracy may be used for determining whether or not an iterative step is to be performed for generating new VCA reference results, as described previously. The score may be determined according to the relations described above or according to other relations.

If the current resolution to be tested is not the first one (i.e. if the resolution has already been decreased), the score associated with the current resolution (VCA_score(i, j) is compared with the score obtained for the higher resolution (VCA_score(i, j−1)) so as to determine whether it is better or not (step 920). If the score associated with the current resolution is greater than or equal to the score associated with the higher resolution or if the current resolution to be tested is the first one, index j is incremented (step 925), the resolution is decreased (step 930), and the algorithm is branched to step 915 to repeat steps 915 and 920 with a lower resolution.

On the contrary, if the score associated with the current resolution is smaller than the score associated with the higher resolution, another test is performed to determine whether or not the score associated with the current profile (and the resolution corresponding to index j−1) is greater than the best score VCA_score (step 935). If the score associated with the current profile (and the resolution corresponding to index j−1) is greater than the best score VCA_score, the best score VCA_score is set to the value of the score associated with the current profile (and the resolution corresponding to index j−1), index k is set to index i, and index l is set to index j minus one (step 940).

On the contrary, if the score associated with the current profile (and the resolution corresponding to index j−1) is smaller than or equal to the best score VCA_score, or after having updated the best score VCA_score and the indexes k and l, index i is incremented (step 945).

Next, another test is performed to determine whether or not all the profiles have been tested (step 950) that is to say whether index i is smaller than n. If index i is smaller than n, the algorithm is branched to step 905 to test another profile.

On the contrary, if index i is greater than or equal to n, the process ends.

As described above by reference to FIG. 7, if the VCA accuracy is greater than a threshold, new VCA reference results are preferably generated.

It is noted that there exist alternatives. For the sake of illustration, profiles may comprise both VCA settings and video stream settings (e.g. frame resolution or encoding settings). In such a case indexes i and j described by reference to FIG. 9 are replaced by a single index.

Dynamic Auto-Setting

Since conditions may change over the time, it is convenient to adapt the settings accordingly. This can be done by adding an additional classification step to the method described above. Such a classification step aims at classifying the chunks of the database used for the auto-setting process in a number of sets (e.g. a predetermined number of sets) corresponding to different environment conditions and at applying the auto-setting process for each set. In operation, the scene may be monitored dynamically so as to change the setting as a function of the environment conditions. Accordingly, by measuring and classifying current conditions of the environment, it is possible to make sure that the appropriate settings are used.

Figure 10:
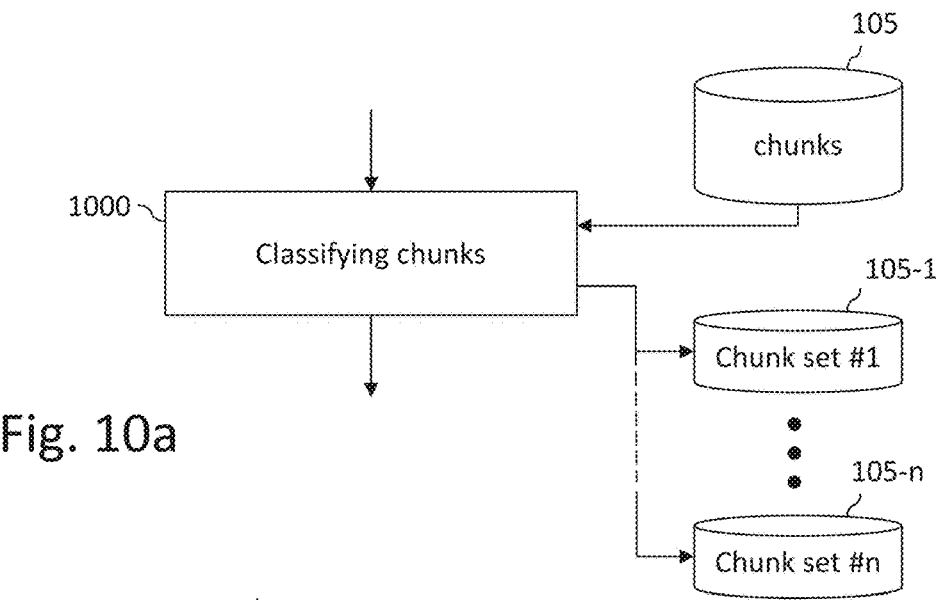
FIGS. 10a, 10b, and 10c, illustrate an example of a method for classifying chunks, for determining VCA reference results for sets of chunks, and for adapting settings according to environment conditions, respectively.

FIGS. 10a, 10b, and 10c, illustrate an example of a method for classifying chunks, for determining VCA reference results for sets of chunks, and for adapting settings according to environment conditions, respectively.

According to particular embodiments and as illustrated in FIG. 10a, the chunks to be classified are those obtained at the end of phase 100 in FIG. 1, that is to say the chunks of database 105. These chunks are classified (step 1000) in a predetermined number n of chunk sets, based on environment conditions that are preferably recorded along with the video stream from which the chunks are extracted. Each set of chunks may be considered as a sub-set of database 105, generically denoted 105-i. The number n of chunk sets may be determined by a user or automatically, for example using a clustering algorithm. The classification can be done automatically according to a standard algorithm where classification parameters can be determined by a user or automatically.

According to a particular embodiment, environment conditions are measured and stored along with the video sequence from which the chunks are extracted. After recording, the environment conditions are gathered into a reduced set of conditions and the chunks obtained from the video sequences are labelled according to this reduced set of conditions. Next, the auto-setting process is performed for each condition of the reduced set of conditions.

After the sets of chunks have been determined, the auto-setting process is preferably applied for each set as illustrated in FIG. 10b.

As illustrated, an index i representing an index of the sets of chunks is set to zero (step 1005) and the set of chunks having index i is obtained (step 1010). Next, VCA reference results are generated for the obtained set of chunks (step 1015). They can be generated as described above, in particular as described by reference to phases 110 and 110' in FIG. 1 and FIG. 7, respectively. Then, after having generated VCA reference results for the current set of chunks, a profile corresponding to this set of chunks is determined (step 1020). The determined profile is preferably the best profile for this set of chunks, that is to say the profile that provides the higher score. It can be determined as described above by reference to FIG. 9.

Next, index i is incremented (step 1025) and a test is performed to determine whether or not index i is greater than or equal to n (step 1030), with n the number of sets of chunks. If index i is smaller than n, the algorithm is branched to step 1010 so as to determine a profile for another set of chunks else, the process ends.

After the auto-setting process has been carried out for each set of chunks, the settings can be adapted dynamically.

To that end, as illustrated in FIG. 10c, a first step is directed to determining the conditions of the environment, denoted cond (step 1035). Next, the profile that corresponds to these conditions is obtained (step 1040) and the VCA is configured accordingly (step 1045). For the sake of illustration, lighting may be considered as the only environment condition to take into consideration, that justifies a change of settings. Moreover, lighting is easy to measure and therefore to classify, without any additional sensor. The images themselves are sufficient to obtain lighting information.

However, other environment conditions may be used such as weather conditions (e.g. snow, fog, and rain). Since it may be difficult to obtain chunks associated with particular environment conditions, augmented reality can be used to simulate such conditions, at least partially.

Figure 11:
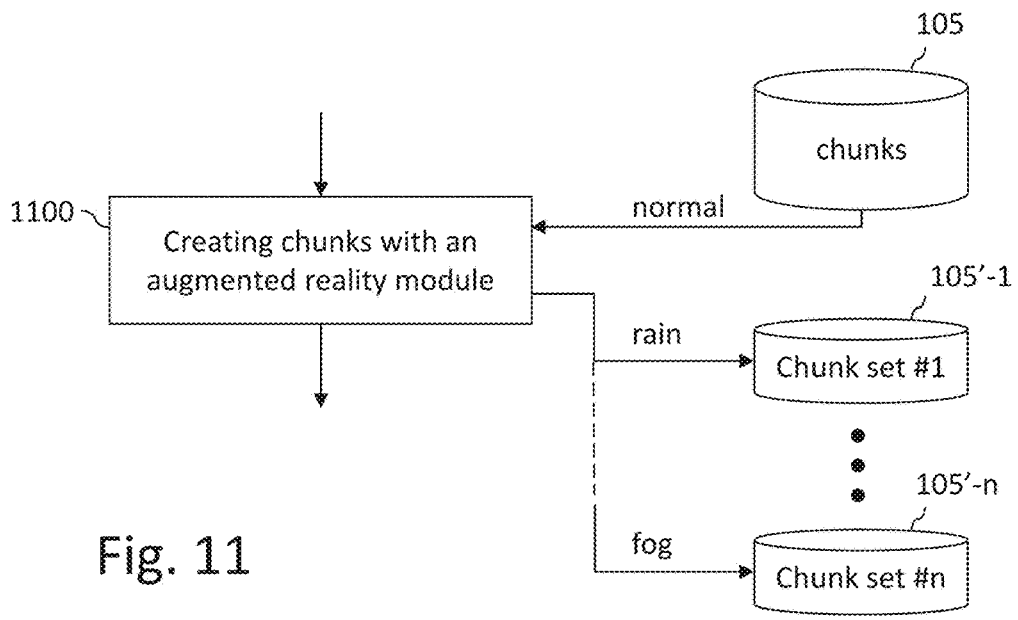
FIG. 11 illustrates an example of a method for creating chunks corresponding to specific environment conditions using augmented reality.

FIG. 11 illustrates an example of a method for creating chunks corresponding to specific environment conditions using augmented reality.

According to particular embodiments and as illustrated, the chunks that are used to create new chunks corresponding to specific environment conditions are those obtained at the end of phase 100 in FIG. 1, that is to say the chunks of database 105. Still according to a particular embodiment, these chunks correspond to normal environment conditions (e.g. without rain, fog, or snow), preferably with different lighting conditions.

An augmented reality module is used and configured for creating specific environment conditions, for example to simulate rain or fog in images (step 1100). Chunks corresponding to the chunks of database 105 are created for each specific environment condition. For the sake of illustration, a set of chunks 105'-1 corresponding to chunks of database 105 is created to simulate rain and a set of chunks 105'-n corresponding to chunks of database 105 is created to simulate fog. Other sets of chunks 105'-i can be created to simulate other environment conditions.

After chunks have been created to simulate specific environment conditions, a profile is determined for each set of chunks as described by reference to FIGS. 10b and 10c.

Auto-Setting Process of Video Stream Settings for Specific Tasks

It is observed that the same video surveillance system or the same VCA system may be used for different tasks, for example for identifying plates on cars and for recognizing faces. However, the optimal video stream settings vary from one task to another. Therefore, there is a need to optimize the settings as a whole or to optimize the settings as a function of the task to be carried out. In this case, the VCA is used only (or mainly) for generating reference results, such as a simulator of the tasks to be carried out.

FIG. 12 illustrates schematically main phases and steps for evaluating settings as a function of different tasks to be performed, according to embodiments of the invention. After having created a database for evaluating settings (phase 100), for example as described by reference to FIG. 1, index i associated with the tasks to be performed is set to zero (step 1200).

Next, a second phase (110") is directed to generating VCA reference results for the task corresponding to index i, to be used as a ground truth for evaluating the efficiency of the settings, as described by reference to phase 110 in FIG. 1. As illustrated, the VCA reference results associated with task i may be stored in database 115'.

Next, based on the previously generated VCA reference results, the current settings may be evaluated (phase 120') and then modified so as to identify efficient video stream settings (preferably the optimal video stream settings) for the tasks having index i, as described by reference to phase 120 in FIG. 1.

After having identified efficient settings, index i is incremented by one (step 1205) and a test is performed to determine whether or not index i is greater than or equal to n, with n the number of tasks to be performed (step 1210). If the index i is smaller than the number n, the algorithm is branched to phase 110" to identify efficient settings for another task. Otherwise, the process ends.

According to particular embodiments, the process described by reference to FIG. 12 is used for identifying the video stream settings in a video surveillance system as a function of the task a user wishes to accomplish. It is noted that some settings (physical settings) of the camera used can be done automatically thanks to auto-setting features such as autofocus and auto-exposure. In such a case, the VCA is used only for identifying the video stream settings (resolution and encoding parameters, e.g. quality), as a metric for evaluating the efficiency of the video stream settings. It is also to be noted that physical settings of the cameras may be evaluated, for example as a function of the ratio of solved and unsolved targets.

Still according to particular embodiments, the VCA settings of a multi-task VCA can be determined as a function of the VCA settings identified for each of the tasks to be performed. For the sake of illustration, the VCA settings can be determined according to the following relation:

$$S = \sum_i \alpha_i S_i$$

where,

S represents the VCA settings for performing several tasks;

$\alpha_i$ represents the use percentage of the VCA for performing task i, its value may be determined statistically or may be set by a user; and $S_i$ represents efficient VCA settings, preferably optimal VCA settings, for performing task i; it is determined according to the method of the invention (e.g. according to phase 120' in FIG. 12), and where $\Sigma_i \alpha_i = 100$.

Figure 13:
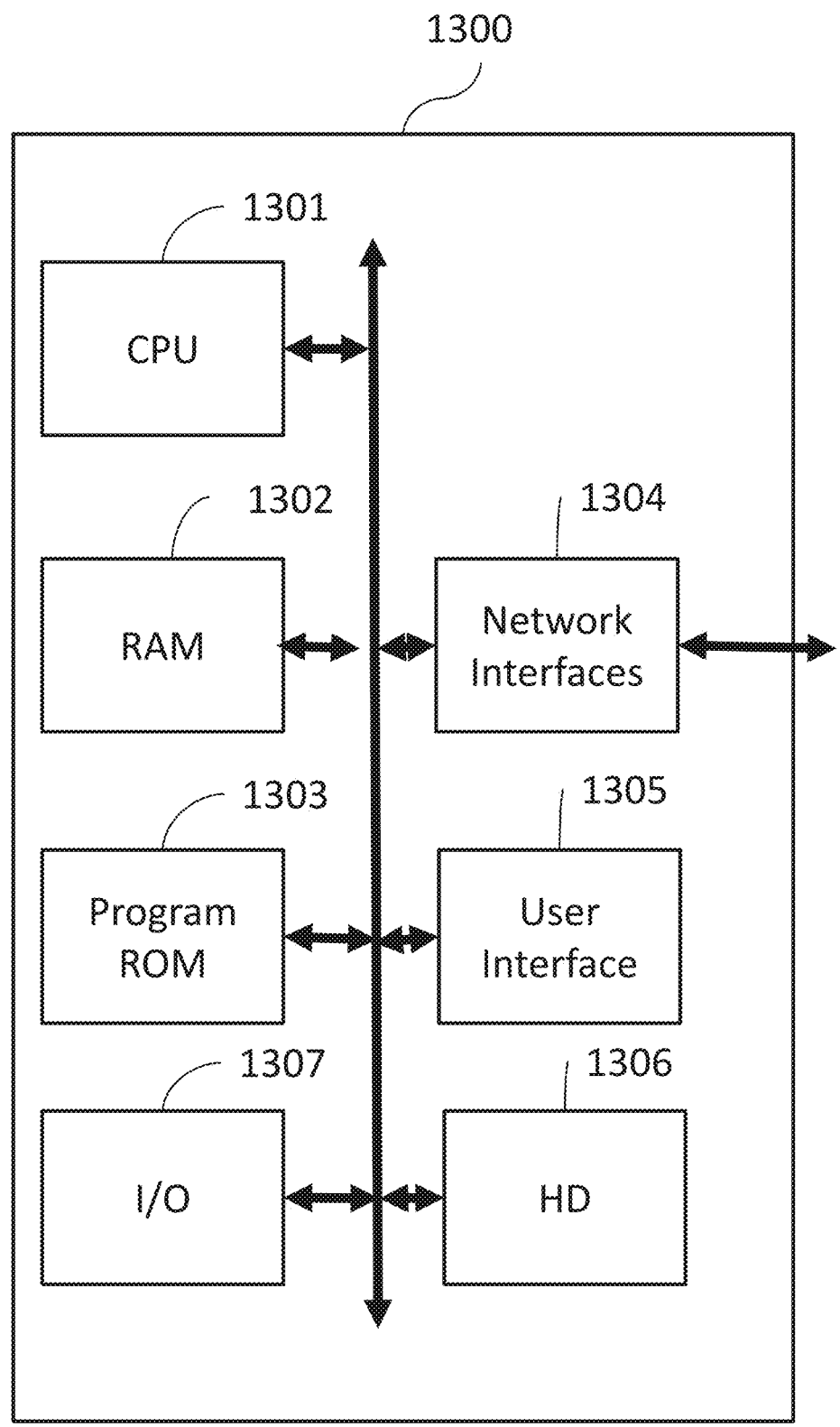
FIG. 13 is a schematic block diagram of a computing device for implementation of one or more embodiments of the invention or of parts of the invention.

FIG. 13 is a schematic block diagram of a computing device for implementation of one or more embodiments of the invention or of parts of the invention. The device may be a computer, a server, a client, or some hardware embedded within a camera. The device 1300 comprises a RAM memory 1302 which may be used as a working memory for a control unit 1301 configured for implementing a method according to embodiments or steps of the method according to the invention. For example, the control unit may be configured to execute instructions of a computer program loaded from a ROM memory 1303. The program may also be loaded from a hard drive 1306.

The device also comprises a network interface 1304 which may be a single network interface, or comprise a set of network interfaces (for instance several wireless interfaces, or several types of wired or wireless interfaces). The device may comprise a user interface 1305 for displaying information to a user and for receiving inputs from the user.

The device may also comprise an input/output module 1307 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

APPENDIX

TABLE 1

| parameters | value |
| --- | --- |
| Codec | H.264 |
| Frame rate | 25 |
| Resolution | 1080 × 1920 |
| Compression (from 0 (no compression) to 100 (maximum compression)) | 30 |

TABLE 2

| Target #1 | | Target #2 | | Target #3 | |
| --- | --- | --- | --- | --- | --- |
| LP characters | Nb of detections | LP characters | Nb of detections | LP characters | Nb of detections |
| CR621CM | 36 | AB225GR | 5 | BD952JP | 15 |
| CH621CM | 3 | N225T | 4 | RD952JP | 2 |
| CR611DI | 1 | H C5 | 4 | HW39520 | 1 |
| | | H W2 | 3 | MD952JP | 1 |
| | | HU 5W | 3 | RD552JP | 1 |
| | | H 2F | 3 | ND020PH | 1 |
| | | N225J | 3 | WWD88 | 1 |

TABLE 2-continued

| Target #1 | | Target #2 | | Target #3 | |
|---|---|---|---|---|---|
| LP characters | Nb of detections | LP characters | Nb of detections | LP characters | Nb of detections |
| | | HU 25H | 2 | MX952JP | 1 |
| | | HU 5M | 2 | B952M | 1 |
| | | BA225GH | 1 | M952W | 1 |
| | | HN459LD | 1 | D852W085NP | 1 |
| | | M8225GR | 1 | | |
| | | HA225GR | 1 | | |
| | | HA225GH | 1 | | |
| | | HN459XD | 1 | | |
| | | NA5235GR | 1 | | |

TABLE 3

| settings | Fps | stream |
|---|---|---|
| | Quality | settings |
| | Resolution | |
| | character size | VCA settings |
| | stop criterion | |
| | threshold 1 | |
| | threshold 2 | |

TABLE 4a

| profile 1 | Fps | 25 |
|---|---|---|
| | Quality | 'high' |
| | Resolution | 1080p |
| | character size | 96 pi |
| | stop criterion | 2s |
| | threshold 1 | 180 |
| | threshold 2 | 260 |

TABLE 4b

| profile 2 | Fps | 15 |
|---|---|---|
| | Quality | 'low' |
| | Resolution | 720p |
| | character size | 72 pi |
| | stop criterion | 1s |
| | threshold 1 | 120 |
| | threshold 2 | 140 |

The invention claimed is:

1. A method for controlling a video surveillance system, the video surveillance system comprising a video content analytics module and a video source, the method comprising:
   generating a set of video content analytics reference results associated with frames for evaluating the efficiency of video content analytics settings, generating video content analytics reference results comprising
      obtaining, by the video content analytics module, from the video source, video data comprising sequenced frames, content of the video data comprising a representation of at least one object;
      analysing at least a part of the video data in the video content analytics module to obtain video content analytics results;
      filtering the obtained video content analytics results to identify at least a subset of the video content analytics results, the identified video content analytics results being valid results forming the set of video content analytics reference results; and
   determining a value for at least one configuration parameter of the video surveillance system using a least a portion of the video content analytics reference results, wherein the determining step comprises a step of computing a score representing the efficiency of the video surveillance system, a score being associated with values of a set of parameters of the video surveillance system, the efficiency of the video surveillance system being estimated by comparing results obtained from the video surveillance system for video data of the video data with corresponding video content analytics reference results, and wherein the determining step comprises a step of comparing scores with each other.

2. The method of claim 1, wherein the filtering step comprises a step of selecting at least one video content analytics result according to spatial and/or temporal features of the representation of the at least one object in frames of the video data.

3. The method of claim 1, wherein the filtering step comprises the steps of:
   identifying and selecting a video content analytics result that is obtained from the greatest number of frames; and
   determining the number of occurrences of the selected video content analytics result in the frames,
   wherein the filtering is based on the determined number of occurrences.

4. The method of claim 1, further comprising a step of discarding a frame of the sequenced frames if the frame is similar to another frame of the sequenced frames, prior to carrying out the analysing step, and
   further comprising a step of determining a position of the at least one object from each of at least two frames of the sequenced frames and a step of comparing the determined positions to each other, one of the at least two frames being considered as similar to another frame of the at least two frames as a function of the comprising step.

5. The method of claim 1, further comprising a step of transcoding frames of the video data, the step of determining a value for at least one configuration parameter being at least partially based on transcoded frames.

6. The method of claim 1, further comprising a step of selecting one configuration parameter of the video surveillance system and for at least two different values of the one configuration parameter, determining optimal values of other configuration parameters.

7. The method of claim 1, further comprising a step of modifying a value of at least one configuration parameter of the video surveillance system and of repeating the steps of analysing at least a part of the video data and of filtering the obtained video content analytics results.

8. The method of claim 7, wherein the modifying step and the repeated steps of analysing and filtering are carried out if the accuracy of the video surveillance system exceeds a threshold.

9. The method of claim 1, further comprising a step of weighting a plurality of values of at least one configuration parameter of the video surveillance system, each of the plurality of values being an optimal value associated with a particular use of the video content analytics module.

10. A non-transitory computer-readable storage medium storing instructions of a computer program for implementing the method according to claim 1.

11. A device for controlling a video surveillance system, the video surveillance system comprising a video content analytics module and a video source, the device comprising a microprocessor configured for carrying out the steps of:
generating a set of video content analytics reference results associated with frames for evaluating the efficiency of video content analytics settings, generating video content analytics reference results comprising
obtaining, by the video content analytics module, from the video source, video data comprising sequenced frames, content of the video data comprising a representation of at least one object;
analysing at least a part of the video data in the video content analytics module to obtain video content analytics results;
filtering the obtained video content analytics results to identify at least a subset of the video content analytics results, the identified video content analytics results being valid results forming the set of video content analytics reference results; and
determining a value for at least one configuration parameter of the video surveillance system using a least a portion of the video content analytics reference results,
wherein the determining step comprises a step of computing a score representing the efficiency of the video surveillance system, a score being associated with values of a set of parameters of the video surveillance system, the efficiency of the video surveillance system being estimated by comparing results obtained from the video surveillance system for video data of the video data with corresponding video content analytics reference results, and wherein the determining step comprises a step of comparing scores with each other.

12. The device of claim 11, wherein the filtering step comprises a step of selecting at least one video content analytics result according to spatial and/or temporal features of the representation of the at least one object in frames of the video data.

13. The device of claim 11, wherein the filtering step comprises the steps of:
identifying and selecting a video content analytics result that is obtained from the greatest number of frames; and
determining the number of occurrences of the selected video content analytics result in the frames,
wherein the filtering is based on the determined number of occurrences.

14. The device of claim 11, wherein the microprocessor is further configured for carrying out a step of discarding a frame of the sequenced frames if the frame is similar to another frame of the sequenced frames, prior to carrying out the analysing step, and
wherein the microprocessor is further configured for carrying out a step of determining a position of the at least one object from each of at least two frames of the sequenced frames and a step of comparing the determined positions to each other, one of the at least two frames being considered as similar to another frame of the at least two frames as a function of the comparing step.

15. The device of claim 11, wherein the microprocessor is further configured for carrying out a step of transcoding frames of the video data, the step of determining a value for at least one configuration parameter being at least partially based on transcoded frames.

16. The device of claim 11, wherein the microprocessor is further configured for carrying out a step of selecting one configuration parameter of the video surveillance system and for at least two different values of the one configuration parameter, determining optimal values of other configuration parameters.

17. The device of claim 11, wherein the microprocessor is further configured for carrying out a step of modifying a value of at least one configuration parameter of the video surveillance system and for repeating the steps of analysing at least a part of the video data and of filtering the obtained video content analytics results.

18. The device of claim 17, wherein the modifying step and the repeated steps of analysing and filtering are carried out if the accuracy of the video surveillance system exceeds a threshold.

19. The device of claim 11, wherein the microprocessor is further configured for carrying out a step of weighting a plurality of values of at least one configuration parameter of the video surveillance system, each of the plurality of values being an optimal value associated with a particular use of the video content analytics module.

* * * * *